(12) United States Patent
Tsuji

(10) Patent No.: US 8,074,967 B2
(45) Date of Patent: Dec. 13, 2011

(54) GATE VALVE FOR VACUUM AND SEAL MEMBER USED THEREFOR

(75) Inventor: Kazuaki Tsuji, Machida (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 582 days.

(21) Appl. No.: 12/306,866

(22) PCT Filed: Jun. 22, 2007

(86) PCT No.: PCT/JP2007/062576
§ 371 (c)(1),
(2), (4) Date: Dec. 29, 2008

(87) PCT Pub. No.: WO2008/001683
PCT Pub. Date: Jan. 3, 2008

(65) Prior Publication Data
US 2009/0250649 A1    Oct. 8, 2009

(30) Foreign Application Priority Data

Jun. 29, 2006   (JP) .................................. 2006-180272

(51) Int. Cl.
*F16K 3/02*   (2006.01)

(52) U.S. Cl. ......... 251/328; 277/560; 277/641; 277/644

(58) Field of Classification Search .......... 251/326–329; 277/560, 641, 644
See application file for complete search history.

(56) References Cited

U.S. PATENT DOCUMENTS

| | | | | |
|---|---|---|---|---|
| 3,401,915 A | * | 9/1968 | Kim | 251/174 |
| 3,575,431 A | * | 4/1971 | Bryant | 277/641 |
| 6,629,682 B2 | * | 10/2003 | Duelli | 251/158 |
| 6,932,354 B2 | * | 8/2005 | Kane et al. | 277/608 |
| 6,964,799 B1 | * | 11/2005 | Mizuno et al. | 428/35.9 |

FOREIGN PATENT DOCUMENTS

| | | |
|---|---|---|
| JP | 11336905 A | 12/1999 |
| JP | 2001241553 A | 9/2001 |
| JP | 2003049949 A | 2/2003 |
| JP | 2004286067 A | 10/2004 |
| JP | 2005252184 A | 9/2005 |

* cited by examiner

Primary Examiner — John Bastianelli
(74) Attorney, Agent, or Firm — The Webb Law Firm

(57) ABSTRACT

A gate valve for vacuum capable of preventing a seal member from being cracked or particles from being produced due to a stress concentration even if the seal member is repeatedly compressed in the state that the adhesive agent is separated from the open side of a seal member mounting groove and capable of suppressing particles from being produced due to the rub of the seal top part with the seal surface.

3 Claims, 7 Drawing Sheets

US 8,074,967 B2

GATE VALVE FOR VACUUM AND SEAL MEMBER USED THEREFOR

TECHNICAL FIELD

The present invention relates to a gate valve for vacuum being used for a semiconductor manufacturing apparatus or the like and to a seal member to be used for the gate valve for vacuum.

BACKGROUND ART

The work processing such as ion plating and plasma etching is carried out in a clean environment and in a high vacuum for a fabrication of a semiconductor such as a silicon wafer, a thin film, and liquid crystal.

As a valve structure for opening and closing an open part that requires an high air-tightness and that a processed substance such as a silicon wafer can be easily transferred into and from, a bonded-type gate valve for vacuum is publicly known.

For instance, the bonded-type gate valve for vacuum has advantages that a sealing performance is higher and a repeated opening and closing operation property is excellent as compared with a conventional seal apparatus in which a seal member is simply mounted in a dovetail groove formed in a plate body.

The plate body is made of a metal such as aluminum, and a seal member made of fluoro-rubber or the like is bonded to the plate body.

FIG. 6 shows a conventional gate valve for vacuum disclosed in Patent document 1. The gate valve for vacuum is disposed for instance on a gate opening section 16 for wafer transfer between a process chamber 2 and a transfer chamber 4.

A gate valve 6 for vacuum is composed of a plate body 8 made of a metal formed in a generally rectangular shape and a seal member 10 made of an elastic material bonded to the peripheral section of the plate body 8. The plate body 8 is fixed to a base 12 having a cross section in a generally L shape. A vertically movable axis or the like 14 is fixed through the center of the base 12 in the longitudinal direction.

In the case in which the gate valve 6 for vacuum has a configuration for opening and closing the gate opening section 16 by only a vertical movement of the axis 14, a sliding causes the plate body 8 to be easily scratched and metal particles to be produced. Consequently, the plate body 8 is pulled to the left in the drawing and is then moved vertically. More specifically, to close the gate opening section 16 in an open state with the plate body 8 being disposed at a lower position, the axis 14 disposed at a lower position is moved to a direction of an arrow X and the plate body 8 is then moved to a direction of an arrow Y. As a result, the seal member 10 is pressed to a valve seat surface 18 formed on the peripheral section of the gate opening section 16 to seal the process chamber 2 closely.

As shown in FIG. 7, for the gate valve 6 for vacuum, a cross-sectional shape of the seal member 10 mounted to the plate body 8 is a generally chevron shape, and a cross-sectional shape of a seal member mounting groove 23 formed on the plate body 8 is an L shape in which an end of the outer side is opened.

The most protruding apex T of the seal member 10 is positioned on the outer side from the center position C of S/2 (right side in FIG. 7), where the width of the bottom surface of the seal member mounting groove 23 is S. That is, A is larger than B.

For the seal member 10 of the gate valve 6 for vacuum, an outer sloped surface 26 is formed on the outer side from the apex T, and an inner sloped surface 28 is formed on the inner side from the apex T. A curve 30 in an arc shape is formed between the outer sloped surface 26 and the inner sloped surface 28.

An inclination $\theta_2$ of the inner sloped surface 28 against to the bottom surface of the seal member mounting groove 23 is larger than an inclination $\theta_1$ of the outer sloped surface 26. That is, $\theta_2$ is larger $\theta_1$.

As described above, the seal member 10 in which the apex T and the inclinations $\theta_1$ and $\theta_2$ are set is bonded to the seal member mounting groove 23 of the plate body 8 with an adhesive agent. The plate body 8 provided with the seal member 10 is disposed between the process chamber 2 and the transfer chamber 4 shown in FIG. 6. The seal member 10 in the plate body 8 is abutted to a wall 21 configuring the gate opening section 16 and compressed in the Y direction by degrees. As shown by an arrow Z in FIG. 8, the seal member 10 is then deformed in such a manner that the seal member 10 is swelled outside from the seal member mounting groove 23. As shown in FIG. 8, an end 10a of the seal member 10 is deformed in such a manner that a part of the seal member 10 hangs out of the seal member mounting groove 23. In the case in which the deforming movement is carried out repeatedly in the state that a part of the seal member 10 hangs out of the seal member mounting groove 23, the adhesive agent is separated. In the case in which the seal member 10 is repeatedly compressed and deformed after the adhesive agent is separated, a stress concentration is applied to the section abutted to the corner of the plate body 8, thereby easily generating a crack 24 in the section. In the case in which a compressive load is applied to the seal member 10 repeatedly after the crack 24 is generated, the crack 24 is grown by degrees. As a result, the seal member 10 is damaged disadvantageously. Even if the seal member 10 is not damaged, particles are produced unfortunately.

Moreover, the rub of the apex T of the seal member 10 with the opponent surface during deformation causes particles to be produced disadvantageously.

Patent document 1: Japanese Patent Application Laid-Open Publication No. 2005-252184

DISCLOSURE OF THE INVENTION

Problems to be Solved by the Invention

The present invention was made in consideration of such conditions, and an object of the present invention is to provide a gate valve for vacuum being used for a semiconductor manufacturing apparatus or the like, for instance, a gate valve for vacuum capable of preventing a seal member from being cracked or particles from being produced due to a stress concentration or a separation of an adhesive agent and of displaying stable sealing performance for a long time.

Means for Solving the Problems

To achieve the above object, a gate valve for vacuum in accordance with the present invention is characterized by comprising a plate body formed in such a manner that the outer end of a seal member mounting groove is opened and a seal member that is mounted in the seal member mounting groove of the plate body and that is made of an elastic material having no edge, wherein the cross-sectional shape of the seal member is formed in a generally chevron shape with an apex T, an outer sloped surface is formed on the lateral outer side of the seal member mounting groove outside from the apex T, an inner sloped surface is formed on the lateral inner side of the seal member mounting groove inside from the apex T, and the apex T is positioned on the inner side of the seal member from the position by S/2, and θ1 is larger than θ2, where the inclination of the outer sloped surface is θ1, the inclination of the inner sloped surface is θ2, and the width of the bottom surface of the seal member mounting groove is S.

By the gate valve for vacuum having the above configuration in accordance with the present invention, a seal member can be suppressed from being deformed outside even if the seal member is compressed. Consequently, a stress concentration is hard to occur at an outer diameter side and an adhesive agent can be prevented from being separated at an outer side. Therefore, particles can be suppressed from being produced due to protruding and hanging outside.

It is preferable that the gate valve for vacuum in accordance with the present invention further comprises a bent point P formed at the lower section of the outer sloped surface and a bottom part in which an inclination of a section on the lateral outer side of the seal member mounting groove outside from the bent point P is gradually decreased.

By the above configuration, protruding and hanging outside, an occurrence of a crack, and a production of particles can be effectively prevented for the seal member.

The seal member in accordance with the present invention is characterized by comprising the cross-sectional shape of a generally chevron shape with an apex T, an outer sloped surface formed on the lateral outer side of the seal member mounting groove outside from the apex T, and an inner sloped surface formed on the lateral inner side of the seal member mounting groove inside from the apex T, wherein the apex T is positioned on the inner side of the seal member from the position by S/2, and θ1 is larger than θ2, where the inclination of the outer sloped surface is θ1, the inclination of the inner sloped surface is θ2, and the width of the bottom surface of the seal member mounting groove is S.

By the seal member having the above configuration, a stress concentration at an outer diameter side can be decreased since a deformation outside is reduced in the case in which the seal member is compressed from the opponent member.

EFFECT OF THE INVENTION

By the gate valve for vacuum in accordance with the present invention, since a deformation outside of the seal member is reduced in the case in which the seal member is compressed and deformed by the opponent member, the seal member can be prevented from being deformed in such a manner that a part of the seal member is swelled outside and hangs out of the seal member mounting groove. By such a configuration, a separation of an adhesive agent is hard to occur. In addition, since a stress concentration is also hard to occur, a crack and damage, and a production of particles can be prevented for the seal member. Moreover, particles can be suppressed from being produced due to the rub of the seal member with the opponent surface by the deformation the top part T.

Moreover, a bent point is formed at the lower section of the outer sloped surface and a bottom part having a gradual inclination is formed outside the bent point. Consequently, protruding and hanging outside can be further prevented for the seal member, thereby effectively preventing an occurrence of a crack and a production of particles.

EXPLANATIONS OF LETTERS OR NUMERALS

Figure 1:
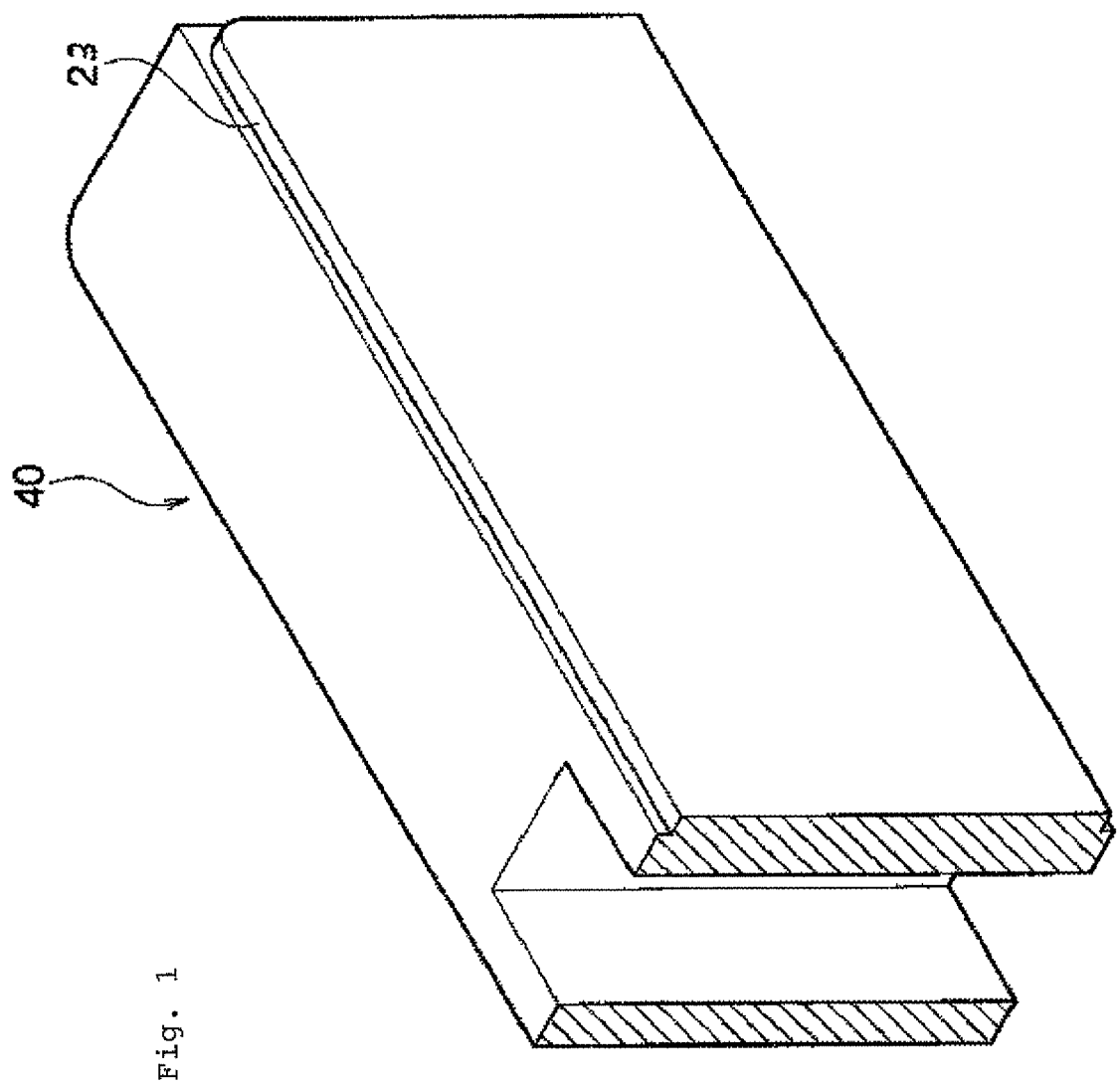
FIG. 1 is a perspective view showing a half part of a plate body configuring the gate valve for vacuum in accordance with an embodiment of the present invention.

22: Wall body
23: Seal member mounting groove
24: Seal member
24d: Outer sloped surface
24e: Inner sloped surface
32: Bottom part
40: Plate body
P: Bent point
T: Apex
θ1 and θ2: Inclination

BEST MODE OF CARRYING OUT THE INVENTION

An embodiment (example) of the present invention will be described below in detail with reference to the drawings.

Figure 2:
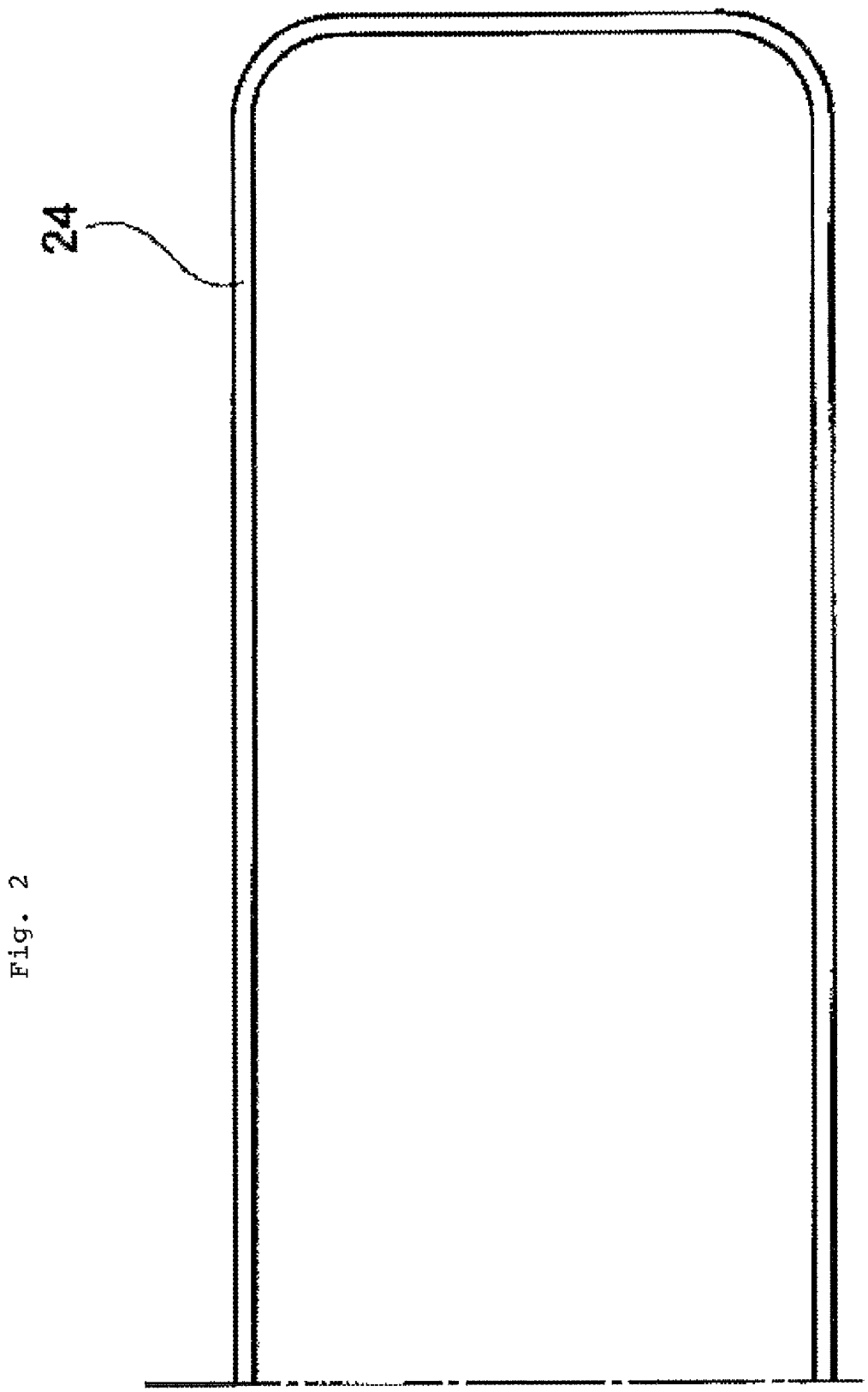
FIG. 2 is a front elevational view showing a half part of the seal member mounted on the plate body of FIG. 1.

FIG. 1 shows a plate body adopted in the gate valve for vacuum in accordance with an embodiment of the present invention, and FIG. 2 is a front elevational view showing a seal member mounted on the plate body of FIG. 1.

Figure 6:
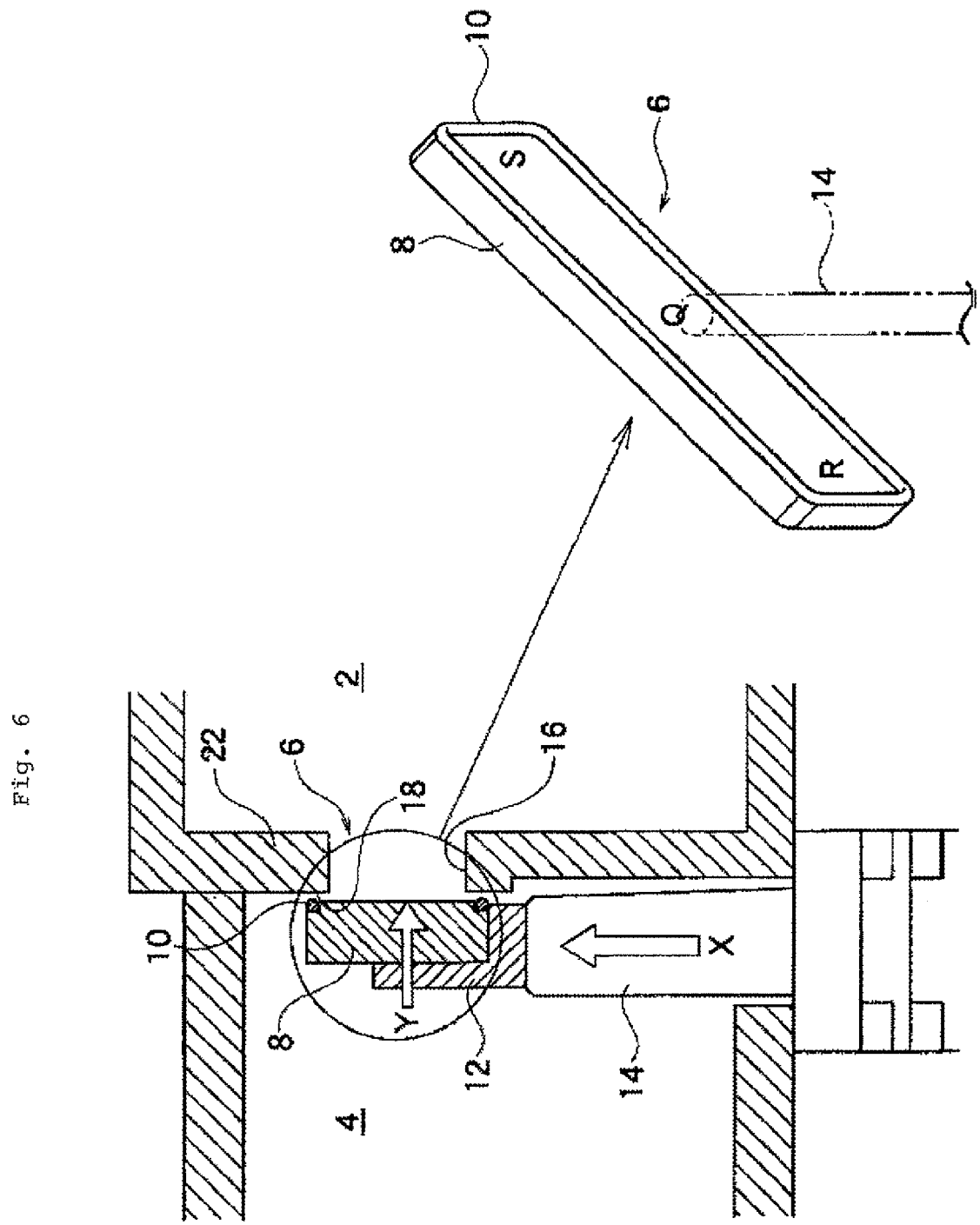
FIG. 6 is a cross-sectional view of a conventional gate valve for vacuum disclosed in Japanese Patent Application Laid-Open Publication No. 2005-252184.
Figure 7:
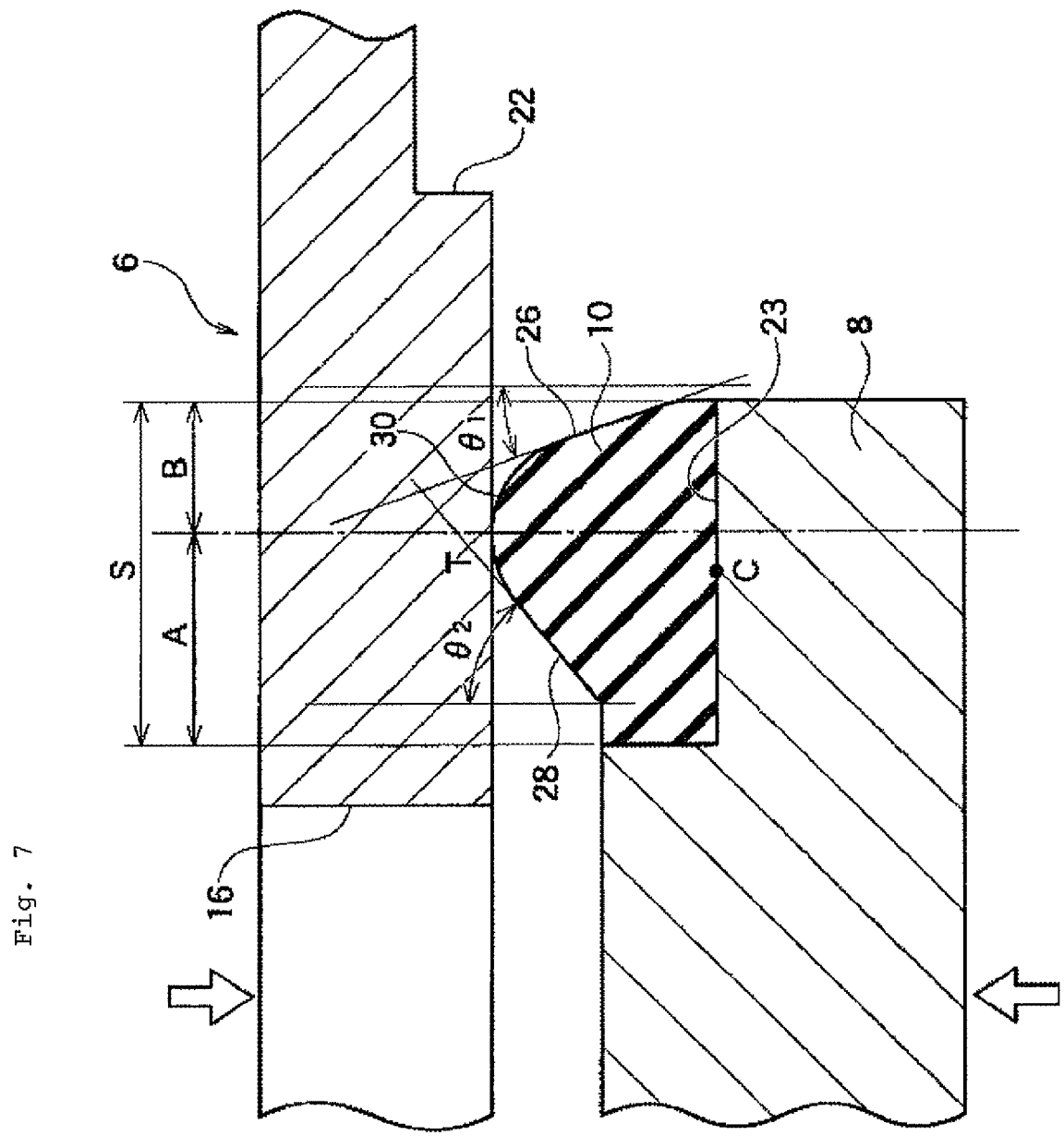
FIG. 7 is a schematic cross-sectional view showing the initial state in which the seal member disclosed in Japanese Patent Application Laid-Open Publication No. 2005-252184 is compressed and deformed.
Figure 8:
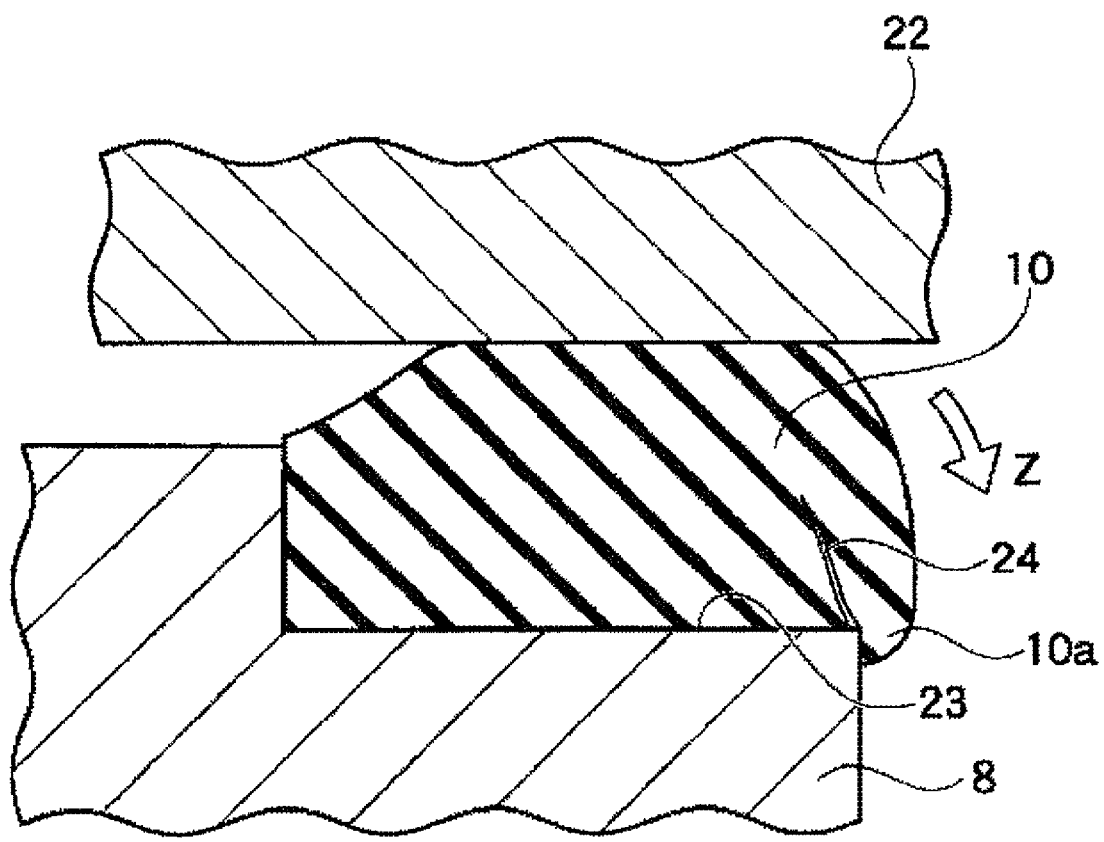
FIG. 8 is a schematic cross-sectional view showing case in which the seal member of FIG. 7 is sufficiently deformed.

FIGS. 1 and 2 are corresponded to FIG. 6. More specifically, a plate body 40 shown in FIG. 1 is corresponded to a plate body 8 shown in FIG. 6 and is made of a metal such as aluminum. The plate body 40 is formed lengthwise in a horizontal direction corresponding to a plate body 8. A seal member 24 is in a band-like shape in a natural state, and is arranged in a circular pattern by being mounted in a seal member mounting groove 23 of the plate body 40.

Figure 3:
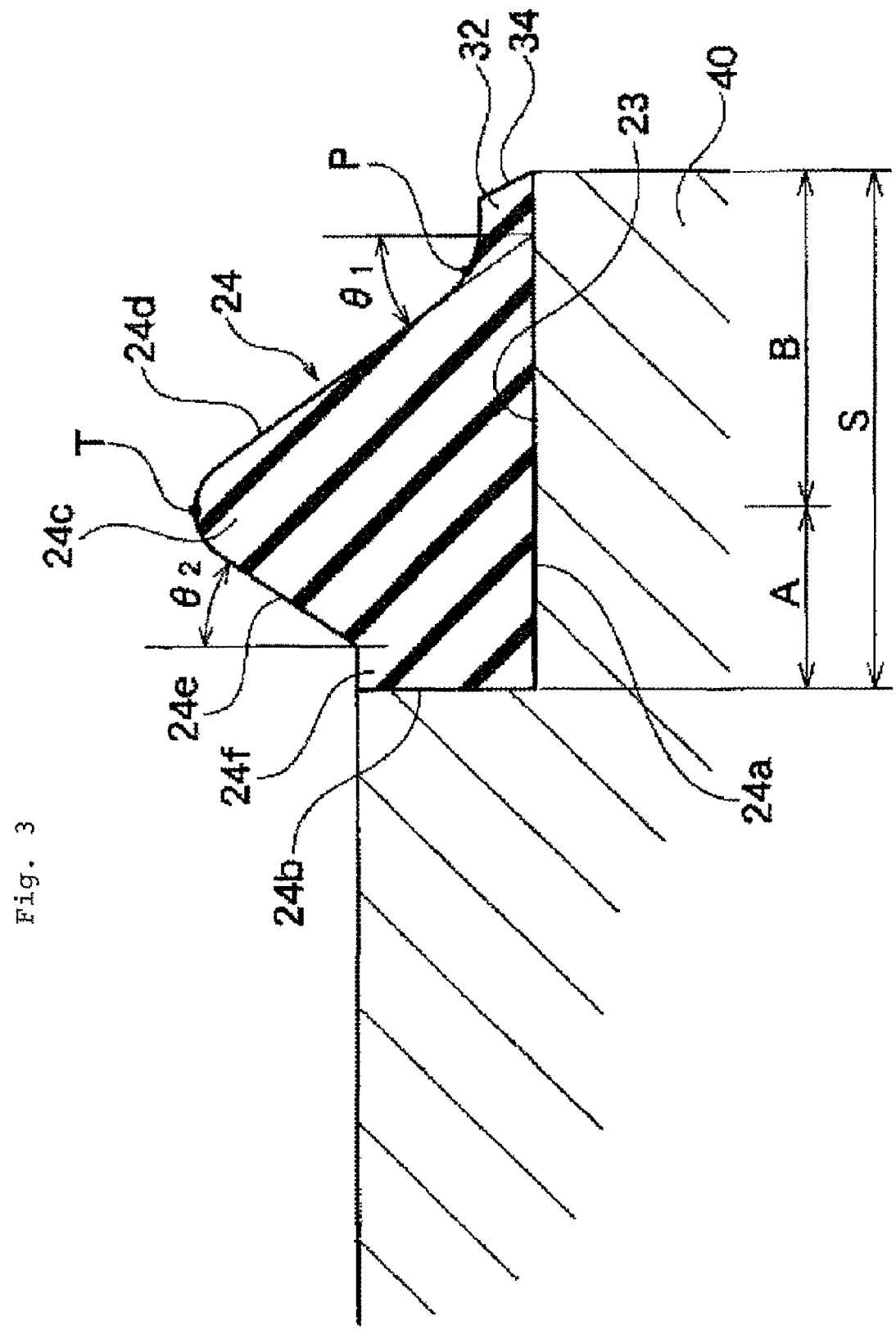
FIG. 3 is a cross-sectional view showing the plate body of FIG. 1 to which the seal member of FIG. 2 is mounted.

As shown in an expanded view of FIG. 3, a seal member mounting groove 23 having a cross section in a generally L shape is formed on a peripheral edge of the plate body 40 shown in FIG. 1 in such a manner that an end of the outer side of the seal member mounting groove 23 is opened. The seal member 24 made of an elastic material shown in FIG. 2 is rigidly bonded to the seal member mounting groove 23 with an adhesive agent.

The seal member 24 is made of fluorinated rubber to be more precise. According to an environment of usage, a material having excellent functions such as plasma resisting property, heat resisting property, and vacuum resisting property can be selected to be used for the seal member 24.

Figure 4:
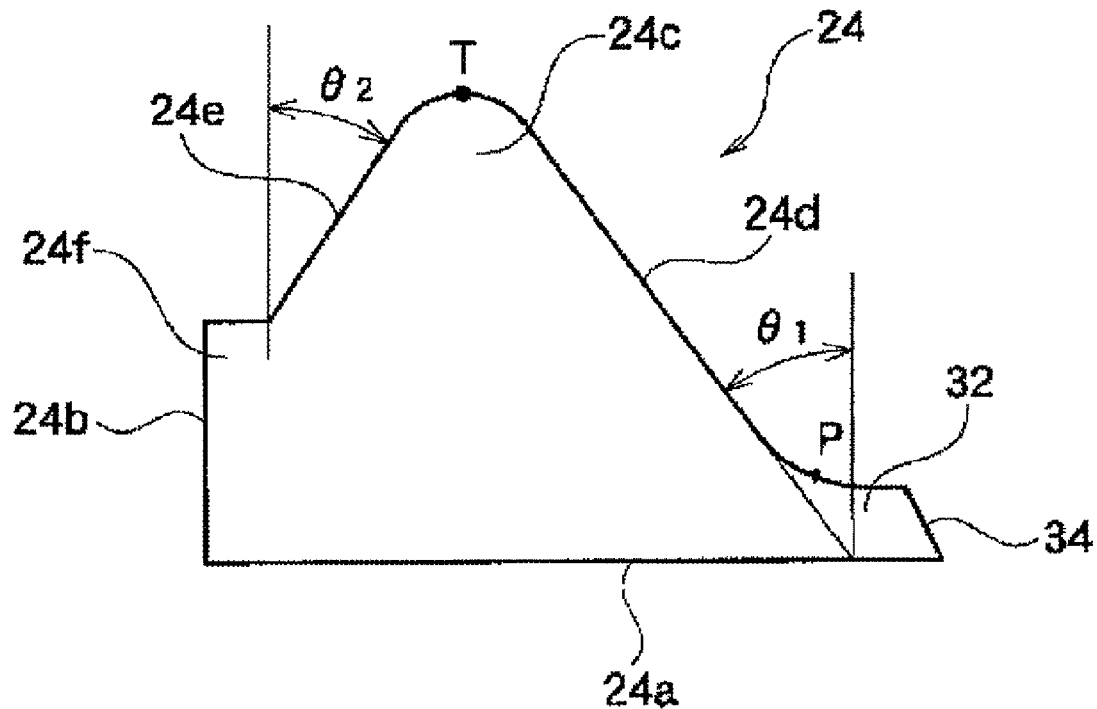
FIG. 4 is a schematic cross-sectional view showing the seal member of FIG. 3.

The cross section of the seal member 24 is formed in the following. That is to say, as shown in FIGS. 3 and 4, the cross-sectional shape of the seal member 24 is formed in a generally chevron shape. In addition, as shown in FIGS. 3 and 4, the seal member 24 has a base side 24a and an inner side 24b perpendicular to each other corresponding to two sides of the seal member mounting groove 23 having a cross section in a generally L shape in which an end of the outer side is opened.

Moreover, the seal member 24 has a protruding portion 24c in an arc shape projecting from the plate body 40 and has an apex T at the top of the protruding portion 24c in an arc shape. An outer sloped surface 24d is formed outside from the apex T, and an inner sloped surface 24e is formed inside from the apex T.

Furthermore, a bent point P is formed at the lower section of the outer sloped surface 24d, and a bottom part 32 is formed in such a manner that an inclination thereof is gradually decreased downward the seal member mounting groove 23 from the bent point P. A chamfer 34 is formed at the end of the bottom part 32.

The apex T of the seal member 24 is positioned on the inner side of the seal member 24 from the position by S/2 where the width of the bottom surface of the seal member mounting groove 23 is S. More specifically, the apex T is positioned in advance in such a manner that B is larger than A in FIG. 3.

A flat base side end part 24f is formed on the lateral inner side of the inner sloped surface 24e for the seal member 24.

The seal member 24 having such a configuration is bonded through an adhesive agent to the seal member mounting groove 23 of the plate body 40 shown in FIG. 1. The gate valve for vacuum provided with the seal member 24 is used as a gate valve 6 for vacuum disposed between a process chamber 2 and a transfer chamber 4 similarly to the case shown in FIG. 6.

The operation of the gate valve for vacuum and the seal member used for the gate valve for vacuum in accordance with the embodiment of the present invention will be described in the following.

Figure 5:
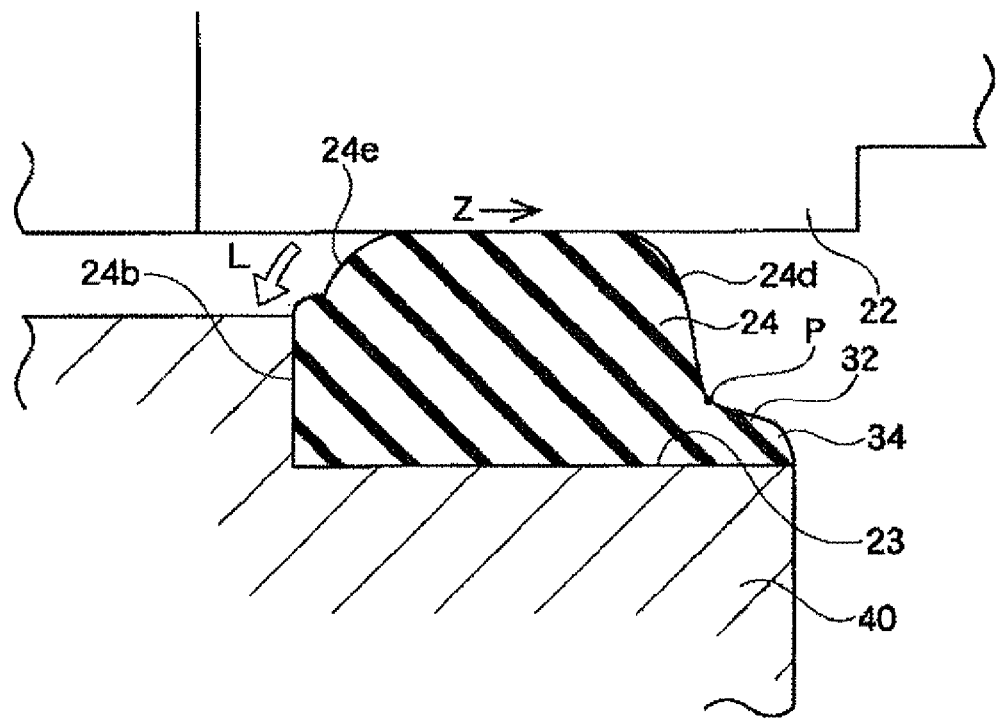
FIG. 5 is a schematic cross-sectional view showing case in which the seal member of FIG. 3 is compressed.

In the case in which the seal member 24 in accordance with the embodiment of the present invention is compressed by a wall body 22 as shown in FIG. 5, a force is applied to the seal member 24 as shown by an arrow L of FIG. 5. The force causes the seal member 24 to be deformed outward, but the reaction force from a wall face in connect with the inner side 24b suppresses or reduce the deformation. In addition, a stress concentration at the outer side can be reduced. Since the compression and deformation to the outer side can be suppressed as described above, a separation of an adhesive agent around the bottom part 32 of the seal member 24 can be prevented and an occurrence of a crack can be prevented. Moreover, for the seal member 24, the bottom part 32 formed at the lower side of the outer sloped surface 24d is hard to be swelled outside the seal member mounting groove. Consequently, an occurrence of a crack at the outer end and a production of particles due to the grown of the crack can be both prevented. Therefore, a stable sealing performance can be expected for a long time. Moreover, prevention of the deformation of the top part T also suppresses generation of particles by the rubbing of mating surfaces.

As described above, by the gate valve for vacuum and the seal member used for the gate valve for vacuum in accordance with an embodiment of the present invention, a deformation outside of a seal member can be suppressed in the case in which the seal member is compressed. Consequently, a stress concentration is hard to occur at the outside end, and an occurrence of a crack and a production of particles can be prevented. Therefore, a stable sealing performance can be displayed for a long time.

While the preferred embodiment of the present invention has been described above, the present invention is not restricted to the embodiment.

For instance, a cross sectional shape of the gate opening section is not restricted to a rectangle.

Moreover, in general, an axis 14 is fixed to the plate body 40 in accordance with the embodiment of the present invention. However, two axes can be used to support the plate body 40 as a matter of course.

The invention claimed is:

1. A gate valve for vacuum comprising a plate body formed in such a manner that the outer end of a seal member mounting groove is opened and a seal member that is mounted in the seal member mounting groove of the plate body and that is made of an elastic material having no edge, wherein the cross-sectional shape of the seal member is formed in a generally chevron shape with an apex T, an outer sloped surface is formed on the lateral outer side of the seal member mounting groove outside from the apex T, an inner sloped surface is formed on the lateral inner side of the seal member mounting groove inside from the apex T, and the apex T is positioned on the inner side of the seal member mounting groove from the position by S/2, and θ1 is larger than θ2, where θ1 is an inclination of the outer sloped surface, θ2 is an inclination of the inner sloped surface, and S is a width of the bottom surface of the seal member mounting groove.

2. The gate valve for vacuum as defined in claim 1, further comprising a bent point P formed at the lower section of the outer sloped surface and a bottom part in which an inclination of a section on the lateral outer side of the seal member mounting groove outside from the bent point P is gradually decreased.

3. A seal member having a cross-sectional shape of a generally chevron shape with an apex T, said seal member placed in a mounting groove of a gate valve, and comprising an outer sloped surface formed on the lateral outer side of the seal member mounting groove outside from the apex T, and an inner sloped surface formed on the lateral inner side of the seal member mounting groove inside from the apex T, wherein the apex T is positioned on the inner side of the seal member mounting groove from the position by S/2, and θ1 is larger than θ2, where θ1 is an inclination of the outer sloped surface, θ2 is an inclination of the inner sloped surface, and S is a width of the bottom surface of the seal member mounting groove.

* * * * *